Aug. 27, 1963 P. H. SHERRON 3,101,777
FOLDING DOOR FOR TELEPHONE BOOTH
Filed Feb. 9, 1961 2 Sheets-Sheet 1

INVENTOR.
PERCIVAL H. SHERRON
BY
Beaser, Smith & Harding
ATTORNEYS

FOLDING DOOR FOR TELEPHONE BOOTH

Filed Feb. 9, 1961

2 Sheets-Sheet 2

*INVENTOR.*
PERCIVAL H. SHERRON
*BY*
Busser, Smith & Harding
ATTORNEYS

United States Patent Office 3,101,777

Patented Aug. 27, 1963

3,101,777

FOLDING DOOR FOR TELEPHONE BOOTH

Percival H. Sherron, Jamaica, N.Y. (% Sherron Metallic Corp., 1201 Flushing Ave., Brooklyn 37, N.Y.)

Filed Feb. 9, 1961, Ser. No. 88,119

3 Claims. (Cl. 160—206)

This invention relates generally to folding doors for telephone booths, and particularly to improved means for guiding such a door.

Normally, a folding telephone booth door which is closed may be opened easily and quickly either from inside or from outside the telephone booth. The sections of the door fold over each other and swing into the booth, in consequence of which when there is no obstruction inside the booth that keeps the door from folding up and swinging into the booth, a person outside the booth has no difficulty gaining access to the interior of the booth. Occasionally, however, an occupant of the booth becomes ill or faint and drops to the floor of the booth, presenting an obstruction which makes it difficult for a person outside the booth to gain access in order to be of assistance to the person in distress. Accordingly, an object of the invention is to provide means for gaining access to the interior of a telephone booth in spite of an obstruction within the telephone booth that keeps the door from folding up and swinging into the booth.

Another object of the invention is to provide a folding telephone booth door which normally, when opened, folds up and swings into the booth, but which, in an emergency, folds up without swinging into the booth.

Other objects of the invention will become apparent when the following description is read with reference to the accompanying drawings, in which.

Figure 2:
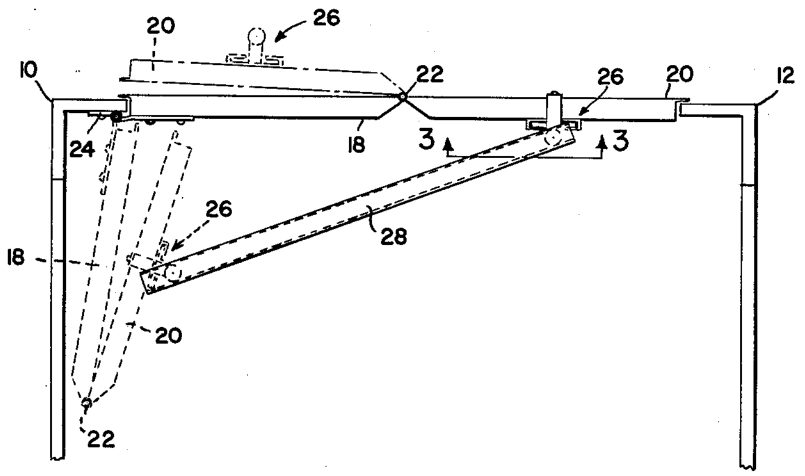
FIGURE 2 is a horizontal section on the plane indicated by line 2—2 of FIGURE 1, but showing the door guide means.
Figure 1:
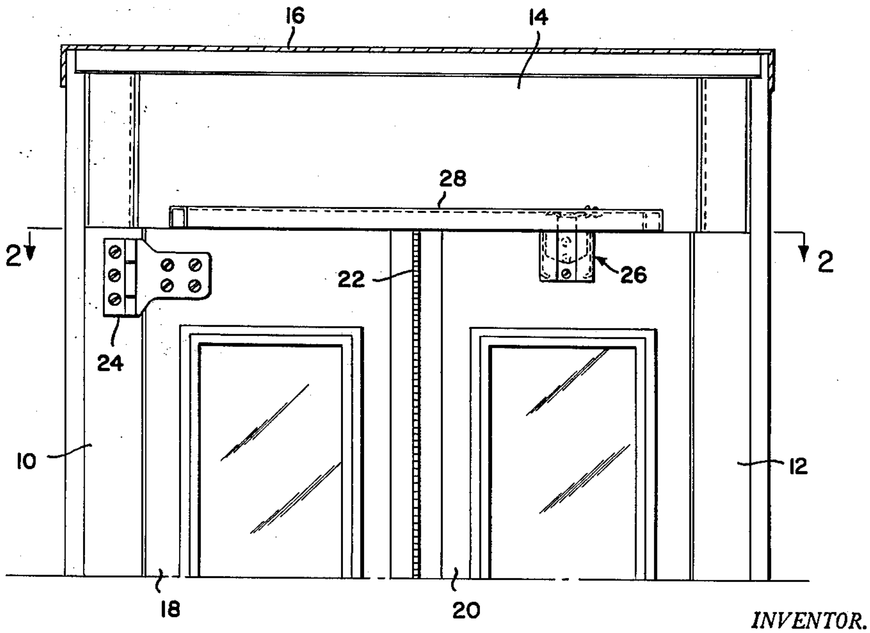
FIGURE 1 is a vertical section looking from within a telephone booth at the front wall thereof.

A telephone booth constructed in accordance with the invention comprises upright corner posts 10 and 12, a lintel 14 extending horizontally between the upper end portions of the corner posts, and a roof 16. In a doorway defined by the lintel 14 and the corner posts 10 and 12 is a door having two sections 18 and 20 joined together by a piano hinge 22. The door is hung on the corner post 10 by a plurality of hinges 24 affixed to the section 18. The section 20 mounts a guide roller assembly, generally designated 26, and immediately above the top of the door is a guide member 28.

Figure 3:
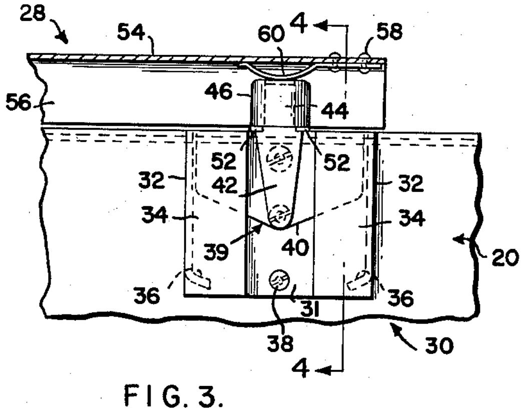
FIGURE 3 is an enlarged view on the plane indicated by line 3—3 of FIGURE 2, part being broken away for the sake of clarity.
Figure 4:
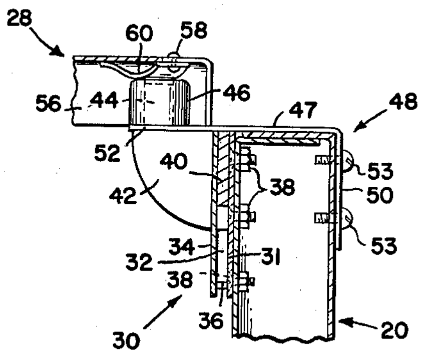
FIGURE 4 is a view on the plane indicated by line 4—4 of FIGURE 3.
Figure 5:
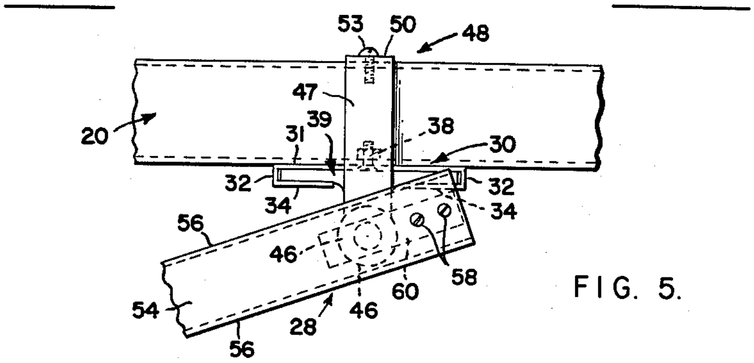
FIGURE 5 is a plan view of the assembly shown in FIGURE 4.

Referring particularly to FIGURES 3, 4 and 5, the guide roller assembly 26 comprises a part, generally designated 30, having a base wall 31, opposite side walls 32 and a pair of flanges 34. The lower end portions of the side walls 32 are turned in to form a pair of stops 36 for a purpose to appear. The part 30 is permanently secured to the inner face of the door section 20 by means of countersunk head bolts 38 which extend through the base wall 31, as shown.

Associated with the part 30 is a bracket, generally designated 39, having a base wall 40 slidably fitted into the channel formed by the part 30, a knee 42 projecting from the base wall 40 freely between the flanges 34 and terminating in an upwardly extending pin 44, which mounts a roller 46.

Extending horizontally over the top edge of the door is one leg 47 of a right angle bracket, generally designated 48. The other leg 50 of the bracket overlies the outer face of the door, being removably secured thereto, as by bolts 53 threaded into tapped openings, as shown. The leg 47 terminates in a bifurcated end portion, the furcations 52 of which embrace the pin 44 and underlie the roller 46, supporting or securing the roller and the roller bracket 39 in the elevated position shown.

The guide member 28 is provided with a base wall 54 and opposite side walls 56 and is stationarily mounted by means not shown. Affixed to the base wall 54, as by screws 58, is a leaf spring 60 arranged for biasing the roller 46 downwardly when the door is fully closed.

Figure 6:
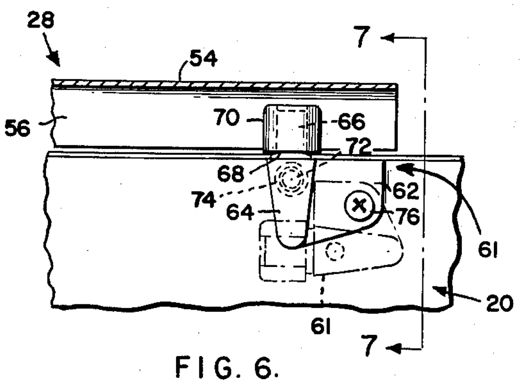
FIGURE 6 is similar to FIGURE 3, but illustrates a modified form of the invention.
Figure 7:
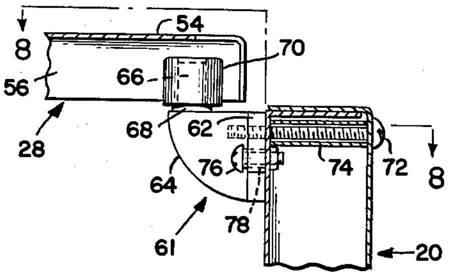
FIGURE 7 is a view on the plane indicated by line 7—7 of FIGURE 6.
Figure 8:
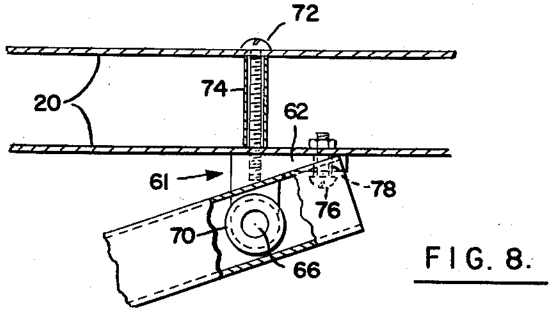
FIGURE 8 is a plan view of the assembly shown in FIGURE 6, part being shown in section and parts being broken away for the sake of clarity.

Now referring to the embodiment illustrated in FIGURES 6, 7 and 8, a bracket, generally designated 61, is provided with a base 62 from which extends a knee 64 terminating in a pin 66 having an enlarged base 68. Mounted upon the pin 66 is a roller 70 seated upon the enlargement 68. The bracket 61 is secured to the inner face of the door section 20 by means of a bolt 72 extending through a sleeve 74 and threaded into the base of the bracket. The bracket is provided with a pivot bolt 76 which extends through a sleeve 78 a substantial distance to one side of the knee 64. The sleeve 78 is somewhat longer than the thickness of the base 62, whereby to provide some clearance between the undersurface of the bolt head and the opposed surface of the base 62.

When the door is closed and it is desired to gain access to the interior of the booth, the door is opened by placing the hand near the center of the door and pushing inwardly, whereupon the door section 18 swings into the booth about the axis of the hinges 24 from the full line to the broken line position shown in FIGURE 2. Simultaneously, the door section 20 swings counterclockwise, as viewed in FIGURE 2, about the axis of the hinge 22 from the full line to the broken line position shown in FIGURE 2, and folds over the door section 18, being controlled by movement of the hinge 22 clockwise in an arcuate path and by movement of the roller 46 or 70 in the way afforded by the guide member 28.

Obviously, when an occupant of the booth lies helpless on the floor, the door section 18 cannot swing into the booth and therefore the door cannot be opened from the outside by pushing inwardly on the door.

In order to gain access to the interior of the booth, the bolts 53 and then the bracket 48 are removed, in consequence of which the bracket 39 and the roller 46 carried thereby, biased downwardly by the spring 60, drop until the bracket 39 strikes the stops 36. Thus the roller 46 is lowered till the top thereof is below the top of the door. Now the door section 20 is free to swing counterclockwise about the axis of the hinge 22 from the full line position to the position shown in phantom in FIGURE 2. Thus free access to the interior of the booth is afforded. After the person in distress has been removed, the roller bracket 39 is raised again and the roller 46 reinserted in the way of the guide member 28, whereupon the securing bracket 48 is replaced for supporting the bracket 39 in its normal, raised position.

Now referring again to FIGURES 6, 7 and 8, in an emergency, the bolt 72 is threaded out from the bracket 61, whereupon the bracket 61 and the roller 70 mounted thereon swing downwardly about the pivot 76 from the full line to the broken line position shown in FIGURE 6. At the same time they move axially on the sleeve 78 sufficiently to allow the roller 70 to disengage from and clear the guide member 28. In the lowered position of the bracket, the bracket in its entirety and the roller 70 are below the top of the door. Thus the door section 20 is free to swing counterclockwise outwardly from the booth about the axis of the hinge 22, as already described in connection with the embodiment of FIGURES 1 to 5, to afford access to the interior of the booth. To restore the door to its normal condition, the bracket 61 is swung back again to its initial position, the roller 70 is reinserted in the guide mmeber 28 and the bolt 72 is replaced.

It will be understood, of course, that the present invention is susceptible of various modifications which may be made without departing from the general principles of the invention. Accordingly, it is intended to claim the same broadly as well as specifically, as indicated by the appended claims.

What is claimed is:

1. A telephone booth including a doorway and a folding door for closing said doorway, means mounting said door for normally folding up and simultaneously swinging into said booth to afford access to the interior of said booth, means guiding said door during opening and closing movements thereof, said guiding means including a horizontally extending stationary guideway and an element normally positioned within said guideway so as to be guided thereby, means mounting said element on said door for movement into and out of said guideway, locking means engaging and positively locking said element in said normal position within said guideway, means operable from the outside of said booth for disengaging said locking means from said element, and resilient means biasing said element for movement out of said guideway upon disengagement of said locking means from said element.

2. A telephone booth including a doorway and a folding door for closing said doorway, means mounting said door for normally folding up and simultaneously swinging into said booth to afford access to the interior of said booth, means guiding said door during opening and closing movements thereof, said guiding means including a horizontally extending stationary guideway and an element normally positioned within said guideway so as to be guided thereby, means mounting said element on said door for movement into and out of said guideway, a bracket removably secured to the outside surface of said door and extending into engagement with said element for positively locking said element in said normal position within said guideway, and resilient means biasing said element for movement out of said guideway upon removal of said bracket from engagement with said element.

3. A telephone booth including a doorway and a folding door for closing said doorway, means mounting said door for normally folding up and simultaneously swinging into said booth to afford access to the interior of said booth. means guiding said door during opening and closing movements thereof, said guiding means including a horizontally extending stationary guideway and an element normally positioned within said guideway so as to be guided thereby, means mounting said element on said door for movement into and out of said guideway, means pivotally securing said mounting means to said door for pivotal movement of said element into and out of said guideway, and a removable locking member extending through said door from the outside surface thereof into engagement with said mounting means for positively locking said element within said guideway whereby said element pivotally moves out of said guideway upon removal of said locking member from engagement with said mounting means.

References Cited in the file of this patent

UNITED STATES PATENTS

| | | |
|---|---|---|
| 821,201 | Taylor | May 22, 1906 |
| 1,092,501 | Miller | Apr. 7, 1914 |
| 1,186,739 | Brady | June 13, 1916 |
| 1,294,202 | Turner | Feb. 11, 1919 |
| 1,857,913 | Judelson | May 10, 1932 |
| 2,104,425 | Kuntz | Jan. 4, 1938 |
| 2,684,506 | Tadd | July 27, 1954 |